United States Patent

[11] 3,558,854

| [72] | Inventors | William Jordan Siegel<br>Silver Spring;<br>Linus Eugene Wallgren, Rockville, Md. |
|---|---|---|
| [21] | Appl. No. | 774,066 |
| [22] | Filed | Nov. 7, 1968 |
| [45] | Patented | Jan. 26, 1971 |
| [73] | Assignee | Pace, Inc.<br>Silver Spring, Md.<br>a corporation of District of Columbia |

[54] MINIATURE ELECTRIC SOLDERING IRON
9 Claims, 3 Drawing Figs.

[52] U.S. Cl. .................................................... 219/233,
30/140; 128/303.14; 219/90, 219/533
[51] Int. Cl. ........................................................ H05b 3/02,
B23k 3/04
[50] Field of Search .......................................... 219/221,
227—241, 533, 90; 128/303.1, 303.14, 303.17,
305; 30/140

[56] References Cited
UNITED STATES PATENTS

| 1,850,280 | 3/1932 | Haynes ........................ | 219/227 |
| 2,978,565 | 4/1961 | Sullivan et al. ............... | 219/221X |
| 3,152,239 | 10/1964 | Faulconer .................... | 219/234 |

FOREIGN PATENTS

| 1,173,550 | 10/1958 | France ......................... | 219/90 |

*Primary Examiner*—A. Bartis
*Attorney*—Fidelman, Wolffe & Leitner

ABSTRACT: The present invention relates to a pencil grip thermal tool particularly suited for miniature soldering work. The working tool tip is made movable relative to the pencil grip by incorporating a movable spring-biased electrical connector assembly inside the pencil grip. This relative movement offers a skilled electronic repair technician a good tactile feel for actual contact between the tool and workpiece.

PATENTED JAN 26 1971  3,558,854
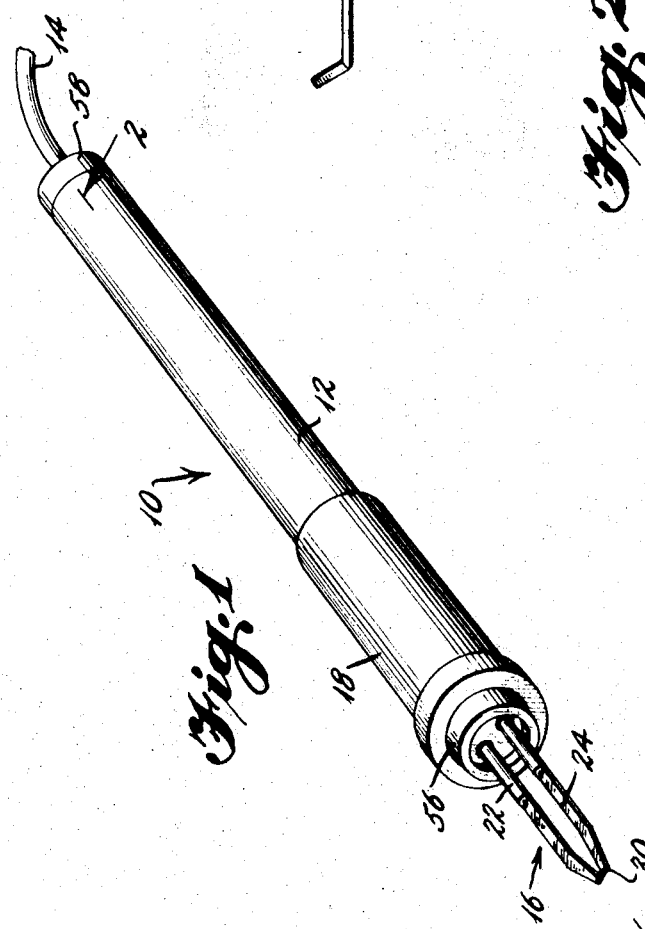
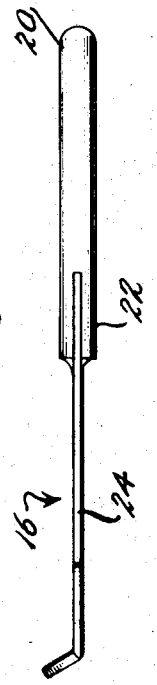
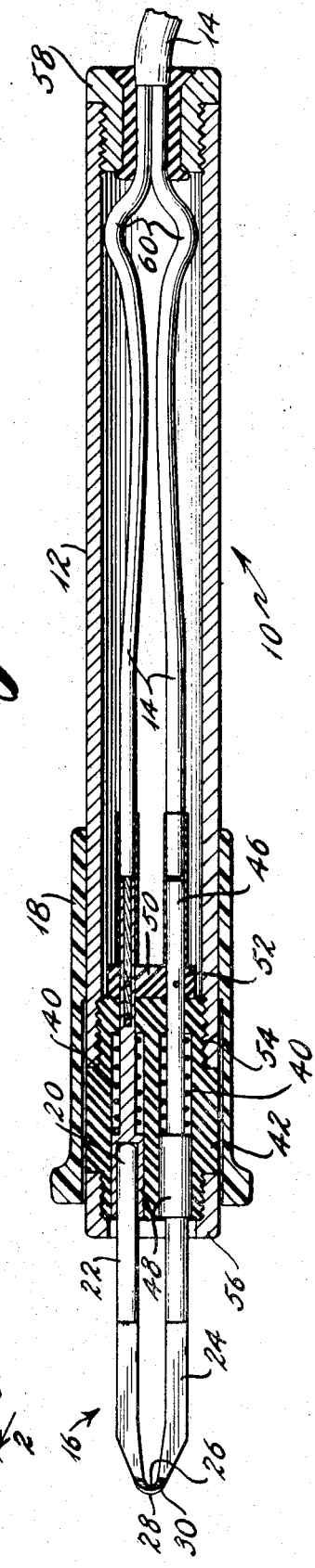

3,558,854

MINIATURE ELECTRIC SOLDERING IRON

The present invention relates to a pencil grip miniature soldering iron, Copending application 643,123 filed June 2, 1967, now U.S. Pat. No. 3,526,750, discloses a pencil grip thermal tool which can be employed both as a miniature soldering iron and as an electric hot knife. The structure of the present invention contain improvements which make the device better adapted as a miniature soldering iron without however completely destroying its alternative as an electric hot knife.

Both soldering guns and electric hot knives have been formed with a working tip in the shape of a hairpin loop created by electrical resistance. Normally the looped end is of greatly reduced cross section relative to the leg end of the tip which is what causes the looped end to resistance heat on passage of current. The increased electrical resistance of the looped end relative to the leg portions concentrates the heating effect at the looped end, although often the leg portions do resist heat somewhat. Despite this overall similarity, the details of construction at the looped end sharply differentiate the electric hot knife from the soldering tool. The knife is provided with a cutting edge of some sharpness while the soldering tool is provided with a tip-end structure adapted to hold a glob of of solder. No such incompatibility exists in the present thermal tool. The looped end of the hairpin loop may be employed for either soldering or thermal parting, i.e. cutting.

According to the present invention the heating tip of the hairpin loop is of a special shape wherein the leg portions are relatively thick, so much so that they resistance heat very little. The looped end, on the other hand, is thinned down to where it may be termed a blade and the flat of the blade is angularly offset from the plane of the hairpin loop as a whole. Relatively sharpened edges on the blade permit cutting, as with any thermal parting knife. The flatter the blade portion serves well to support a glob of solder or to hold down and reflow the solder of a lap joint, allowing the tool to be employed for soldering purposes. In soldering use, the flat of the blade will clamp the materials to be soldered together, and heat the joint during soldering, and afterward act as a heat sink while the soldered joint cools.

The object of the present invention is to provide a soldering iron adapted for careful work on a closely confined working area.

A further object of the present invention is to provide a miniature soldering iron.

Another object of the present invention is to provide a thermal tool of considerable sensitivity.

According to the present invention, the operator's control over the heating tip of a pencil grip operator's tool is enhanced by providing a spring structure in the pencil grip, and by permitting spring-controlled relative movement between the heating tip and the pencil grip. A compression spring mounted just behind the heating tip of the thermal tool can be made to compress at the slightest touch, thereby giving a skilled repair technician an accurate tactile fee for working contact between the tool and the workpiece. This enhanced feel for the work permits the skilled repair technician to place extremely small amounts of solder on tiny wires. For example, the technician can solder leads to circuit boards, or integrated circuits even chips, without damaging fine lead wire or smearing solder over the area adjacent to the connection.

The detailed structure of the present tool and the operational advantages thereof may best be understood by reference to the accompanying drawing in which;

FIG. 1 diagrammatically illustrates the thermal tool as a whole;

FIG. 2 is a section taken along line 2–2 of FIG. 1;

FIG. 3 is an enlarged fragmentary view of the heating tip in side elevation.

Referring now to FIG. 1 it may be seen that the thermal tool 10 comprises a pencil grip handle 12 with power leads 14 emerging from the rear thereof and a heating tip 16 detachably mounted at the front end thereof by a quick-release friction connection. Presence of a sleeve 18 at the forward end of handle 12 has been found advantageous.

As shown in FIG. 3, the heating tip 16 comprises a hairpin loop structure with a pair of rear end portions 20 which need not be of same length. End portions 20 seat in and are frictionally engaged by prongs 48 inside the pencil grip handle 12. The main exposed leg portions 22 of the heating tip 16 are of increased diameter relative to the looped end 24 of tip member 16 so as to provide a relatively large low resistance path for electric current, thereby minimizing resistance heating of legs 22 and of rear end portions 20. The looped end 24 of tip 16 is of thinned down blade shape with relatively sharpened front and rear edges 28 and 26 and a blade flat 30 whose plane is angularly offset from the plane in which the parallel leg and rear portions 20 and 22 lie. A preferred angular offset for blade flat 30 is illustrated in the drawing wherein a bend provided at the tip end 24 causes blade flat 30 to bear against a workpiece when handle 12 is held in a normal pencil grip manner.

The blade edges 28, 26 are sharpened but only in a relative sense. As knife edges go they are quite dull, even without a true cutting edge. Blade edges 26 and 28 effect thermal parting rather than cutting. The relative thinness of the looped end 24 makes the blade flat 30 resistance heat quite rapidly. Also its low mass makes the blade flat 30 cool down quickly after the electric power has been switched off.

By and large the heating tip 16 may have the same resilient looped end 24 disclosed in the copending application Ser. No. 643,123 alluded to previously. However, when such a heating tip 16 is employed in the thermal tool construction of the present invention flexure movement rarely, if ever, is utilized by the repair technician. The reason is that a spring structure now provided inside the pencil grip handle 12 normally acts first to relieve the mechanical stresses applied against heating tip 16.

The internal structure of hollow pencil grip handle 12 is illustrated in FIG. 2 wherein may be seen a pair of compression springs 40 mounted to provide for the desired resilient movement of heating tip 16.

A connector housing 42 made of an insulating material serves to support and electrically isolate the electrical connections for heating tip 16. Connector housing 42 is fixed to pencil grip handle 12, e.g. by a male-female threaded connection therewith, and constitutes an extension thereof. Sleeve 18 conceals the joint between handle 12 and connector housing 42.

A pair of tubular connector pins 46 extend through the base 44 of connector housing 42 to terminate in cylindrical or prongs gripping members 48. The metallic gripping member 48 constitutes the quick-release friction grip for rear end portions 20 on heating tip 16. Each compression spring 40 is disposed inside circular wells in connector housing 42 concentric of connector pin 46 with one end bearing against base 44 of connector housing 42 and the forward end bearing against the gripping member 48. A control block 50 is fixed to connector pins 46 by pins 52. Control block 50 bears against the base 44 of connector housing 42.

Connector pins 46 and control block 50 constitute an integral electrical connector assembly movable relative to connector housing 42, appropriate clearance being provided to permit connector pins 46 to slide back and forth in the apertures on base 44 of connector housing 42. The compression set on springs 40 bias connector pins 46 in their forward position with control block 50 bearing against the relatively immovable base 44 of connector housing 42.

When heating tip 16 is inserted into gripping members 48, the force so applied compresses springs 40 and the entire subassembly of the heating tip 16, the gripping members 48, connector pins 46 and control block 50 resiliently moves as a unit until full compression of springs 40 occurs. By this time heating tip 16 has been fully inserted into gripping members 48 in good electrical contact therewith. Release of the force applied while inserting heating tip 16 permits springs 40 to return the assembly to the forward position with control block 50 once again bearing against the base 44 of connector housing 42. In like fashion subsequent use of thermal tool 10, as in soldering for example, pressure applied by blade flat 30 against a workpiece compresses springs 40 creating longitudinal movement of heating tip 16 relative to pencil grip handle 12. This movement gives the skilled repair technician a sensitive tactile feel for contact between tool and workpiece, thereby facilitating careful work in close quarters, as in miniature soldering, for example.

A threaded cap member 56 may be provided at the front end of the connector housing 42. At the rear of handle 12, an end plug 58 may be provided to friction grip power supply leads 14 at their point of entry to handle 12. Plug 58 prevents strain on the joints between the power supply leads 14 and connector pins 46. It may be noted that the electrical connection of leads 14 to pins 46, connects leads 14 to a relatively movable assembly, and the forward terminal portions of power leads 14 also will move relative to handle 12. Accordingly a bend or wrinkle 60 in power leads 14 may be provided inside handle 12 to take up the movement of the power supply leads 14 whenever spring 40 is compressed and the assembly moves.

Thus, in the thermal tool 10 as a whole provision of readily replaceable heating tips 16 and a quick-connect feature allows the user to substitute whatever shape of tip replacement is not time consuming. The thermal tool of the present invention is expressly adapted for miniature soldering work, yet may still be employed for thermal parting. In particular the present tool has been found highly advantageous for soldering and parting work on printed circuit boards where intense heat must be applied only to virtually, pinpoint areas. For such close work the resilient tactile feel of contact between the tool and work piece has proven to be of considerable benefit to repair technicians.

Advantageously control block 50 may be split longitudinally (not shown) into two control block elements. Such a split permits each spring 42 and its associated connector pin and block element to move independently. With a unitary heating tip such as heating tip 16 the resilient action of split block elements and of a unitary block is the same. However, a split control block permits a substantial change in the nature of the tip member means. Separate tip member segments may be inserted into gripping members 48. A parallel gap-type of resistance heating can be effected, with the current passing through that part of the workpiece disposed in the gap between the tip segments. Independent springing of separate heating tip segments or electrodes is almost required because the working surface, e.g. a round lead wire, is rarely a planar surface. Independent springing permits each segment to make its own good contact with the work.

We claim:

1. A thermal tool comprising a pencil grip handle, a power lead entrance at the rear of said handle and a handle and a resistance heated tip member disposed at the front end of said handle, said tip member further comprising a hairpin loop with leg end portions of the loop extending rearwardly inside said handle into an electrical connection with said power leads and a front looped end formed as a thinned down blade flat, the electrical connection between said tip member and said power leads further comprising a spring-biased connector means inside said pencil grip handle movable axially relative to said pencil grip, with said leg end portions securing to the connector means, said connector means and tip member being biased forward whereby pressure exerted against the front end of said tip member causes resilient rearward movement of said tip member and connector means against the spring bias thereof.

2. A thermal tool as in claim 1 wherein said connector means includes a friction grip member for holding said tip member therein, permitting thereby quick release replacement of said tip member.

3. A thermal tool comprising a pencil grip handle, a power lead entrance at the rear of said handle, and heating tip member means disposed at the front end of said handle, said pencil grip further comprising a hollow handle with power leads extending therein to form the rear end thereof and the tip member means extending thereinto from the front end thereof, a connector housing fixedly secured in the front end of said handle, and a spring-biased electrical connector means mounted in said connector housing at the terminus of said power leads and to which the tip member means is electrically secured, said connector means directly electrically connecting said power leads to the tip member means, said connector means and tip member being movable axially relative to the handle and being biased forward by the spring bias of the connector means, whereby pressure exerted against the front end of said heating tip member causes resilient rearward movement of said tip member and connector means against the spring bias thereof.

4. A thermal tool as in claim 3 wherein the electrical connector means further comprises a pair of connector pins extending longitudinally of the hollow handle joined at their rear to the power leads and having at their front end a quick release grip member adapted to grip said tip member means.

5. A thermal tool as in claim 4, wherein said connector housing has an apertured base portion thereon, said connector pins slidably passing through the apertures on the base portion and wherein a control block is fixed to said connector pins at a location thereon adjacent the rear side of the apertured base portion of said connector housing, said block being movable relative to said connector housing and handle, whereby pressure applied against said tip member means causes the tip member means, connector pins and control block to move rearward relative to said handle as a unitary whole, the block normally bearing against the base portion acting thereby as a forward stop.

6. A thermal tool as in claim 5 wherein the apertures in the base portion of the connector housing open into wells in the housing and wherein a coil spring is seated in each said well annularly around the connector pin passing through said aperture, said coil spring bearing against the housing and said grip member biasing the connector pin in a forward direction.

7. A thermal tool as in claim 3 wherein said tip member means further comprises a hairpin loop with the leg end portions of the loop extending rearwardly into said electrical connector means and with a front looped end formed as a blade flat, the blade flat being disposed at an angle relative to the plane of said hairpin loop tip member as a whole.

8. A thermal tool as in claim 3 wherein the electrical connector means further comprises a pair of connector pins extending longitudinally of the hollow handle joined at their rear to the power leads and having at their front end a quick release grip member adapted to grip said tip member means and wherein said connector housing has an apertured base portion thereon, said connector pins slidably passing through the apertures on the base portion and wherein a control block element is fixed to each of said connector pins at a location thereon adjacent the rear side of the apertured base portion of said connector housing, said block being movable relative to said connector housing and handle each control block serving to limit forward movement of its pin, whereby pressure applied against said tip member means causes the tip member means connector pins and each control block to move relative to said handle.

9. A thermal tool as in claim 8 wherein a single control block has both connector pins fixed thereto whereby the tip member means, connector pins and control block constitute a unitary assembly movable relative to said handle.